Patented July 20, 1948

2,445,644

UNITED STATES PATENT OFFICE 2,445,644

OXYGEN-TREATED HYDROCARBON RESINS AND COMPOSITIONS CONTAINING THE SAME

Frank J. Soday, Baton Rouge, La., assignor to The United Gas Improvement Company, a corporation of Pennsylvania No Drawing. Application June 20, 1944,
Serial No. 541,263

6 Claims. (Cl. 260—23)

This invention pertains to the use of certain hydrocarbon resins in coating compositions.

More particularly, this invention relates to the use in coating compositions of resins derived by the polymerization, by thermal and/or catalytic methods, of the high boiling hydrocarbon material separated in monomeric form from tar formed during the production of combustible gas by processes involving the pyrolytic decomposition of petroleum oil with or without the aid of catalysts, the said resin possessing unusually good drying properties.

A feature of the invention is the provision of drying oil coating compositions comprising a resin of the type described dissolved in a bodied drying oil. Pigments, fillers, coloring agents, driers, anti-skinning agents, plasticizers, softeners, solvents, particularly hydrocarbon solvents, and/or other additives, also may be incorpoarted in such coating compositions, if desired.

Coating compositions comprising a resin dissolved in a mixture of bodied drying oil and a volatile hydrocarbon solvent have long been employed in the industry for coating a variety of surfaces, such as those of wood and steel. Among these coating compositions are those prepared from dark-colored resins and employed for painting surfaces where a colorless coating is not required. Examples of these coating compositions are varnishes, paints, and enamels used for coating structural steel surfaces in general, agricultural implements, the under surface of car bodies, railroad rolling and stationary stock, and the like.

In general, it may be said that the most important requirements for such coating compositions are (1) the ability to adhere to metallic or other surfaces for prolonged periods of time without checking, scaling, cracking, or other signs of disintegration, (2) the ability to protect the coated surface from attack by moisture or other destructive agents, (3) resistance to deterioration by actinic rays, (4) resistance to abrasion or other mechanical attack, (5) resistance to attack by mild acid or alkaline agents or solutions, and (6) the absence of any reactive or corrosive agents in the coating compositions.

While coating compositions of the type described are commonly prepared from certain natural and artificial resins, such as rosin, gilsonite, petroleum pitch, still residues obtained as a by-product of the distillation of hydrocarbon stocks, resins obtained as a by-product of the solvent extraction of lubricating stocks, other hydrocarbon resins, and the like, such coating compositions have not been entirely satisfactory from all standpoints. Thus, for example, coating films prepared from such coating compositions usually fail within a short period of time upon exposure to the atmosphere.

In my copending application, Serial No. 423,304, filed December 17, 1941, which has matured into Patent 2,395,076, dated February 19, 1946, I have disclosed the use of the resin obtained by the thermal and/or catalytic polymerization of the unsaturated monomeric material boiling within the range of from 210° to 350° C., and separated in monomeric form from higher boiling pitch constituents of the tar formed during the production of gas by processes involving the pyrolytic decomposition of petroleum oil, with or without the aid of catalysts, in the preparation of coating compositions of the drying oil type. Such coating compositions possess outstanding properties, particularly from the standpoint of coating metallic surfaces.

I have now discovered that the drying time of such coating compositions may be largely improved by the removal of certain natural inhibitors present in such resins prior to use, and that this may be accomplished by contacting the said resin, a solution of the resin in a suitable solvent, or the monomeric material prior to polymerization, with oxygen or oxygen-yielding agents.

I have further discovered that such resins are soluble in, or compatible with, the less expensive drying oils, such as, for example, linseed, fish, perilla, soya, and similar oils, or mixtures thereof, and the less expensive hydrocarbon solvents, such as, for example, mineral spirits and V. M. and P. naphtha, and/or mixtures thereof with aromatic hydrocarbons. Thus, they are ideally suited for the prepartion of fairly inexpensive compositions designed to coat a wide variety of surfaces, such as wood, metal, cement, concrete, brick, ceramic, or other surfaces.

The hydrocarbon constituents of petroleum tar of the type described have usually been considered to comprise residual tar, dead oil, and light oil. The residual tar comprises the heavy black pitch constituents of the tar, together with any oil unseparated therefrom. The dead oil comprises oil separated from the residual tar and boiling higher than, say, 200–210° C. The light oil comprises oil separated from residual tar and boiling lower than, say, 200–210° C.

It has been discovered that very considerable quantities of such resin-forming unsaturated monomeric material above referred to, including large quantities of readily heat polymerizable material, may be contained in the tar produced in the vapor phase pyrolysis of crude petroleum oil or a fraction or fractions thereof, such as, for example, gas oil or residuum oil. This is particularly so in the case of petroleum oil gas tar produced when the pyrolysis is conducted at relatively high temperatures, such, for example, as in the manufacture of oil gas or carburetted water gas at average set temperatures above 1300° F. and also particularly so when the oil pyrolyzed is naphthenic, such as a crude oil classifiable in classes 5 to 7, inclusive, according to the method of classification described in Bureau of Mines Report of Investigations 3279, or a fraction or fractions of such an oil.

The possibility of recovering large quantities of resin forming monomeric unsaturated material boiling in the dead oil range was long unrealized. This was because the usual distillation procedures for the purpose of petroleum tar dehydration and/or tar fractionation were such as to polymerize the readily heat polymerizable monomers boiling in the dead oil range into heavy polymers, which were inextricably mixed with the heavy black residual pitch constituents and lost therein.

In copending application Serial Number 370,608, filed December 18, 1940, by Edwin L. Hall and Howard R. Batchelder, which has matured into Patent 2,387,259, dated October 23, 1945, such heat polymerizable monomeric hydrocarbons boiling in the range of from 210 to 350° C. and separated from the heavy black pitch constituents of the petroleum tar are described and claimed, together with heat polymers produced therefrom.

In copending application Serial Number 386,232, filed April 1, 1941, by Waldo C. Ault, which has matured into Patent 2,387,237, dated October 23, 1945, there is described and claimed the production of catalytic resins from the heat polymerizable and/or catalytically polymerizable monomeric hydrocarbons boiling within the range of from 210° C. to 350° C. and separated in monomeric form from the heavy black pitch constituents of the petroleum tar.

In the manufacture of oil gas and carburetted water gas, the tar produced is usually in the form of an emulsion due to the condensation of hydrocarbon constituents from the gas in the presence of water simultaneously condensed from the gas or otherwise present.

In copending application 342,735, filed June 27, 1940, by Edwin L. Hall and Howard R. Batchelder, which has matured into Patent 2,366,899, dated January 9, 1945, there is described a method of dehydrating such petroleum tar emulsions and of fractionating the hydrocarbon constituents thereof by rapid distillation with the separation from the heavy pitch constituents of residual tar of such heat polymerizable unsaturated monomeric hydrocarbons boiling in the dead oil range.

In copending application 353,034, filed August 17, 1940, by Howard R. Batchelder, which has matured into Patent 2,383,362, dated August 21, 1945, there is described the dehydration of such petroleum tar emulsions and the fractionation of the hydrocarbon constituents thereof with the recovery of monomeric unsaturated heat polymerizable dead oil constituents separate from the heavy black pitch constituents of residual tar, by the solvent extraction of the emulsion with a hydrocarbon solvent such as liquefied propane or butane.

Other processes, for example fractional condensation, might be employed to recover these relatively high boiling unsaturated hydrocarbons in monomeric form and separate from the heavy black pitch constituents of the tar. Also, processes for oil pyrolysis which avoid the formation of emulsions, may be employed for the production of the monomeric material. Furthermore, while it may be preferred to employ for pyrolysis petroleum oils or cuts therefrom, which are classifiable in classes 5 to 7 inclusive according to Bureau of Mines Report of Investigations 3279 as indicated above, and particularly those in class 7, other oils may be employed.

Whatever process of oil pyrolysis is employed in the production of this monomeric material, and whatever process is employed for separating the resultant tar, a very important factor is the exercise of care in the treatment of the tar in order to avoid excessive polymerization of these readily heat polymerizable dead oil constituents and their loss as polymers mixed with the heavy black pitch constituents of the residual tar.

As a result of separation of the light oil and dead oil components of the products of such petroleum oil pyrolysis from the residual tar, without polymerization or with materially reduced polymerization, a substantially pitch-free hydrocarbon material may be separated having a portion boiling within the range from 210° C. to 350° C. which may contain from 5% to 30%, and higher, of monomeric unsaturated hydrocarbons readily polymerizable by heat.

The particular concentration of this heat polymerizable monomeric material obtained in a given case will depend upon the amount of polymerization produced in separating it from the residual tar, as well as upon such factors as the conditions of pyrolysis and the character of the petroleum oil pyrolyzed.

As previously stated, the above mentioned heat polymerizable monomeric material may be readily polymerized by heat to form valuable resins.

Polymerization may be effected by heating the total material separated from the residual tar sufficiently to polymerize the readily heat polymerizable monomers boiling within the range of from 210° to 350° C., but insufficiently to appreciably polymerize the heat polymerizable material contained in lower boiling ranges, such, for instance, as methyl styrenes and styrene. This may be accomplished, for example, by heating with stirring for 4 hours at 200° C., followed by distillation under vacuum to isolate the resin.

It may be preferable, however, to first effect a separation by fractional distillation between light oil boiling below, say, 210° C. and dead oil boiling above, say, 210° C.

The heat polymerizable monomeric material boiling within the range of 210° to 350° C. is so readily polymerizable by heat, that, in the fractional distillation of the light oil from the dead oil, a portion of the monomeric material is usually unavoidably polymerized and remains as polymer dissolved in the other constituents of the dead oil after the light oil is taken off overhead.

The polymerization of the heat polymerizable unsaturated monomeric material in the separated dead oil may be effected by heating the dead oil with stirring, for example, for four hours at 200° C.

The resin thus produced, together with any resin produced during the separation of the light oil from the dead oil, may then be isolated by distillation under vacuum.

In the separation of lower boiling hydrocarbon material from the pitch constituents of residual tar by various methods, the oil separated may contain components boiling above 350° C. and there may be present heat polymerizable monomeric material boiling outside the range of from 210° C. and 350° C. together with the monomeric material boiling within that range. On polymerization therefore the resin may include polymers derived from monomers boiling outside said range along with polymers derived from monomers boiling within said range.

As herein before stated, after polymerization the resin may be isolated by distillation in vacuum, which may be assisted by steam. The yield, melting point, and other characteristics of the resin will depend upon the extent to which the isolation has been carried, or, in other words, upon the proportion of associated oils left in the resin.

Exhaustive steam distillations of the resins obtained from the unsaturated monomeric material isolated from tar by the distillation or solvent extraction methods described herein have produced resins having melting points as high as from 185° C. to 200° C. and higher, cube in mercury, as determined by the method and apparatus described in A. S. T. M. Procedure D61-24, with the following modifications.

1. Mercury is employed in depth of 2½ inches instead of water.
2. The cube of resin is rigidly supported by clamping the hook upon which the resin is attached so that the top of the cube is 1 inch below the surface of the mercury.
3. A 1½ inch immersion thermometer is employed and is immersed to that depth.
4. The exact temperature at which the resin becomes visible at the surface of the mercury is recorded as the softening point of the resin.
5. The melting point of the resin is calculated from the softening point by the following formula.

Melting point °C.=
softening point °C. × 1.25 + 2° C.

The melting point of the resins described in this specification is intended to mean melting point as determined by the above recited method, unless otherwise specified.

Lower melting point resins may be readily obtained in greater yields by less exhaustive removal of the associated oils, thus resins ranging from very soft to hard resins having high melting points may be obtained as desired.

It has been usually found that each 6% of associated oils left in the resin lowers the melting point about 10° C.

Heat resins having melting points of 120° C. have been readily produced in yields corresponding to 20 to 30% of the dead oil in the case of the tar distillate produced in accordance with the process described in copending application Serial No. 342,735, and resins of the same melting point have been obtained in yields as high as 60% of the dead oil in the case of dead oil separated from extract produced in the process described in application Serial No. 353,034.

The heat polymerizable unsaturated monomeric material is preferably in sufficient concentration in that portion of the hydrocarbon material separated from the residual tar which boils within the range of from 210° to 350° C. to produce on polymerization by heat a 120° C. melting-point resin in quantity equal to at least 10 percent of the hydrocarbon material boiling within the range from 210° C. to 350° C., and preferably at least 20 percent, or higher, but lower concentrations may be employed.

The color of the resins obtained may vary from yellow to dark brown.

Heat polymer resins produced from dead oil separated from residual tar by the distillation process described in said copending application, Serial No. 342,735, have shown a tendency to be lighter in color than those produced from dead oil obtained from the solvent extraction of tar with propane and butane as described in said copending application, Serial No. 353,034. Also, heat polymer resins produced from the lower boiling portions of the dead oil have shown a tendency to be lighter in color than heat polymer resins produced from the higher boiling portions, especially such a portion as that boiling in a dead oil cut taken from 180° C. to 210° C. under a vacuum equivalent to 20 mm. of mercury, absolute.

The following example will serve to illustrate the preparation of resins from such unsaturated fractions by thermal polymerization methods.

*Example 1*

Approximately 1000 grams of dead oil derived from the rapid distillation of oil gas tar in accordance with the process described in said copending application, Serial No. 342,735, and subsequent separation of the distillate, was weighed into a 2-liter 3-necked flask equipped with a thermometer and a short reflux condenser. The oil was then slowly stirred and heated over a Bunsen burner at a liquid temperature of 200° C. (±10° C.) for a period of 4 hours.

At the conclusion of this period, the material was allowed to cool somewhat and was then transferred for distillation to a tared 2-liter flask equipped with a ground glass neck.

The oil was accurately weighed at this point.

The flask was provided with means for measuring vapor temperatures and was connected with condensing apparatus and with means for providing a vacuum including a pressure control device. Bumping during distillation was avoided by folding several folds of iron wire to such length that one end reached slightly into the neck of the flask while the other end rested on the bottom of the flask.

The pressure was reduced to 100 mm. Hg, absolute, and heat applied by means of a Bunsen burner. The distillation was continued at a pressure of 100 mm. Hg absolute, until the vapor temperature reached 180° C. During this first stage of the distillation, care should be exercised to prevent crystallization of naphthalene, if present, such as by employing a condenser operating at elevated temperatures.

When the vapor temperature reached 180° C. at a pressure of 100 mm. Hg absolute, the flame was lowered and the pressure gradually reduced to 20 mm. Hg, absolute, using care to avoid bumping. When a pressure equivalent to 20 mm. Hg, absolute, was reached, the pressure was maintained at that value, and the distillation continued until a vapor temperature of 195° C. was reached.

During the second stage, the condenser may be cooled by cold water, but care should be taken to avoid the solidification of anthracene, if present.

The distillation was conducted rapidly, 5 to 10 cc. of oil per minute being removed.

When a vapor temperature of 195° C. was reached, the source of heat was removed and air was permitted to enter the apparatus slowly until atmospheric balance was restored.

In the above operation the yield of resin was 29.3%, with an actual melting point of 128° C., which was calculated to be equivalent to a yield of 31.4% at a melting point of 120° C. The color of the resin was light brown.

A straight run A. S. T. M. distillation of 100 cc. of the original oil gave the following data:

| | |
|---|---|
| First drop | °C 194 |
| 5 cc | °C 212 |
| 10 cc | °C 223 |
| 20 cc | °C 234.5 |
| 30 cc | °C 242.5 |
| 50 cc | °C 256.5 |
| 70 cc | °C 283.0 |
| 90 cc | °C 319.0 |
| Decomposition point | °C 319.0 |
| Total distillate | cc 87 |
| Density at 20° C | 1.0107 |

As pointed out previously, the high boiling monomeric material derived from tar obtained in the pyrolysis of petroleum, by rapid distillation or solvent extraction methods, may be polymerized to form resins of the type desired by the application of certain catalysts, either with or without the simultaneous, or otherwise, application of heat.

Catalysts such as mineral acids, for example, sulfuric acid, hydrogen chloride, acids of phosphorus, or acid acting metallic halides or complexes of said halides, preferably organic solvent complexes, as for example, boron trifluoride, aluminum chloride, boron trifluoride-diethyl ether complex, boron trifluoride-dimethyl ether complex, boron trifluoride-phenyl ether complex, boron trifluoride-phenyl methyl ether complex, boron trifluoride-dioxan complex, boron trifluoride-toluene complex, corresponding aluminum chloride complexes, and the like, may be employed for this purpose.

The metallic halides and their complexes employed are characterized by their ability to hydrolyze in the presence of water to give an acid reaction and, hence, for convenience they may be termed acid acting metallic halides.

Though acid-acting catalysts are preferred, other catalysts may be employed if desired such, for example, as catalysts of the neutral surface type. Examples of such catalysts are activated clays, silica gel, activated carbon, and the like.

As an example of a convenient procedure for the production of resins of the type desired with the use of sulfuric acid as catalyst, the following is given.

Example 2

A sample of the oil to be polymerized, say 500 cc., is poured into a two-liter 3-neck flask equipped with a thermometer and stirrer. To the oil is added 96% $H_2SO_4$ while agitating vigorously. The acid is added 1 cc. at a time and the temperature is not permitted to exceed 50° C. The addition of the acid is continued in this manner until no further temperature rise is noted. The amount of acid necessary to achieve this end has been found to be about 1%, by volume, of the oil present.

The oil then is diluted with approximately an equal volume of naphtha, toluene, or similar diluent, and the solution decanted into 500 cc. of warm water (approximately 60° C.), leaving the acid sludge behind.

After settling, the water layer is drawn off, and neutralization of the acid is accomplished by use of a 10% to 20% aqueous solution of sodium hydroxide. After washing with caustic, an additional water wash may be made. In either case, the resin solution is dried by filtration through a bed of a suitable drying agent, such as lime.

If desired, the diluent may be added before polymerization instead of after polymerization.

After neutralization and drying, the resin may be isolated from the unpolymerized oil by any desired method, or the resin may be concentrated therein by vacuum distillation, which may be assisted by steam. The melting point of the resin and the yield obtained will depend, among other things, upon the extent to which the resin has been removed from the unpolymerized oil.

A convenient procedure for the production of resins of the type desired by the polymerization of monomeric unsaturated material, derived from tar resulting from the pyrolysis of petroleum, with the use of metallic halide catalysts or metallic halide-organic solvent complex catalysts is illustrated in the following examples.

Example 3

A 10 gram portion of the selected catalyst is suspended in 300 cc. of benzene by stirring. A 300 cc. portion of the dead oil separated from distillate recovered from petroleum tar emulsion by flash distillation as described in said copending application, Serial No. 342,735, is added dropwise from a separatory funnel while maintaining the temperature of the reaction mass below 50° C. When the addition has been completed, the mass is stirred for a period of 2 hours and then neutralized with an aqueous solution of sodium hydroxide (10 to 20%). Stirring is continued for an additional hour.

Clay or any other desired filter aid then is added and the mass is filtered. The aqueous layer is separated and discarded, after which the treated material is washed with hot water until the washings are neutral to litmus. The treated material then is filtered through lime to remove water or otherwise dried, and the resin isolated by any desired method.

The unsaturated dead oil employed in the following example was extracted from petroleum tar emulsion, along with light oil, following the procedure described in copending application Serial Number 353,034. After separation of the light oil, the unsaturated dead oil was treated in the following manner.

Example 4

A 532.6 gram portion of this unsaturated dead oil was treated with 8 cc. of 66° Bé. $H_2SO_4$ according to the procedure described in Example 2. Toluene was added after polymerization. Approximately 42% of the dead oil was converted to resin having a melting point of 97° C. and a brown color. The end temperature of the distillation for the removal of oil from the resin was 192° C. and the end pressure was equivalent to 18 mm. of mercury, absolute. A total of 145.9 grams of oil was recovered. The calculated yield of resin having a melting point of 120° C. was 36.2%.

As pointed out previously, the unsaturated dead oil employed for the preparation of resins of the type desired may be polymerized by (a) thermal means, (b) catalytic means, or (c) a combination of thermal and catalytic means. In the latter case, the processes may be carried out consecutively without the intermediate removal of resin, or the resin may be removed between successive treatments.

The unsaturated dead oil used in the following example was obtained from petroleum tar emulsion by the process of copending application Serial No. 342,735. After separation from light oil, it was treated to remove heat polymerizable unsaturates by heating at 200° C. for 4 hours, followed by removal of the heat polymer resin formed. It was then subjected to catalytic polymerization by the following method.

*Example 5*

A 500 gram portion of the said unsaturated dead oil was treated with 6 cc. of 66° Bé. H₂SO₄ according to the method described in Example 2. Naphtha was added after polymerization. Approximately 19% of the dead oil was converted to resin having a melting point of 88.2° C. and a light yellow brown color. The end temperature of the distillation for the removal of oil from the resin was 185° C., and the end pressure was equivalent to 20 mm. of mercury, absolute. A total of 407.9 grams of oil was recovered. The calculated yield of resin having a melting point of 120° C. was approximately 15%.

Examination of the monomeric unsaturated material and associated oil boiling within the range of from 210 to 350° C. described herein and the resins produced therefrom have shown that these materials are predominately aromatic.

Density determinations have indicated that the density of 25° C. of the resins obtained as above described frequently falls within the approximate range of 1.12 to 1.20, with resins produced from dead oil from the solvent extraction of tar tending to be somewhat higher than those produced from dead oil from rapid tar distillation. The densities of the acid polymers tend to be somewhat lower than those of the heat polymers derived from the same unsaturated dead oil. Resins of this type having other densities may be employed, however.

The molecular weights of the resins produced as previously described necessarily vary with the melting point, which also varies with the presence of varying quantities of associated oil among other factors. Determinations by the Benzene Freezing Point Depression method have shown such resins usually have molecular weights ranging from 308 to 758 over a range of melting points from 80.5 to 195° C. as determined by the cube in mercury method.

The fracture of the high melting point resins described herein may range from conchoidal to hackly. In general, the polymers are quite brittle.

The resins described herein, except those hardened by exhaustive steam distillation to a very high melting point, will usually react positively to the anthraquinone reaction, indicating the presence of anthracene, unless produced from lower boiling portions of the dead oil, which do not contain anthracene, or unless the anthracene has been otherwise removed.

The resin described herein usually will give but a slight diazo reaction, indicating the substantial absence of phenols.

The resins produced as described usually will give negative Lieberman Storch reactions, indicating the absence of rosin acids.

Upon thermal decomposition of the resins of the type produced as above described herein, appreciable yields of material boiling within the range from 210° C. to 350° C. will be produced.

The heat polymer resins of the type produced as above described usually are substantially completely soluble in carbon disulfide and benzol.

The quantity of resin insoluble in a mixture containing 50% petroleum ether and 50% pentane varies with the melting point of the resin, and may be of the order of 52% in the case of a thermal resin having a melting point of 95° C. and of the order of 80% in the case of a thermal resin having a melting point of approximately 183° C. (Cube in mercury method.)

The quantity of resin of the type produced as above described insoluble in a mixture of 50% petroleum ether and 50% pentane, but soluble in CCl₄, may be of the order of 50% for a thermal resin having a melting point of 95° C. and of the order of 74% in the case of a thermal resin having a melting point of 183° C. (Cube in mercury method.)

The quantity of thermal resin insoluble in both the petroleum ether-pentane solution and CCl₄ usually is very low, ranging from a fraction of a percent to the neighborhood of 6 or 7%.

In general, catalytic polymers are much more soluble than heat polymers from the same unsaturated dead oil in all solvents except the alcohols.

The polymers from unsaturated dead oils obtained from the rapid distillation process described in copending application, Serial No. 342,735, tend to be more soluble in those solvents tried than similarly produced polymers from unsaturated dead oils obtained by the solvent extraction process described in copending application, Serial No. 353,034.

The above described characteristics of color, density, fracture, melting point, molecular weight, diazo reaction, Lieberman Storch reaction, anthraquinone reaction, thermal decomposition, and solubility are given for the purpose of illustration. It is not intended to imply necessarily that the resin produced as described above and employed herein may not depart somewhat from this illustrative description in one particular or more.

Furthermore, the addition of other materials to the heat polymerizable monomeric unsaturated materials prior to polymerization or to the resins after polymerization may of course modify the properties of the resins produced. Examples of such materials are other synthetic or natural resins, plasticizers, softeners, fillers, coloring materials, etc.

The resin employed may comprise mixed polymers of monomeric material boiling within the range of from 210° C. to 350° C., together, if desired, with polymers of monomers boiling outside of this range, or resins may be employed which are produced from monomers boiling within a selected range or ranges within the range of from 210° C. to 350° C. for instance from separated material boiling above, say, 250° C. or, say, above 280° C.

In separating such material, the dead oil containing the monomers may be fractionated by distillation under vacuum, assisted by steam, to avoid undue polymerization during the separation, or other methods of separation may be employed.

As previously pointed out, the herein described resins, namely, those obtained by the thermal and/or catalytic polymerization of the unsaturated monomeric material recovered from the tar formed during the production of gas by processes involving the pyrolytic decomposition or conversion of hydrocarbon oil, with or without the aid of catalysts, may be treated to remove certain natural drying inhibitors therein by contacting (a) the resin, in solution or not in a suitable solvent, and/or (b) the monomeric unsaturated high boiling aromatic material from which the resin is derived (in solution or not), with oxygen and/or agents capable of generating oxygen.

Examples of suitable treating agents are oxygen, air, ozone, and various organic and/or inorganic peroxides, such as benzoyl peroxide, hydrogen peroxide, sodium peroxide, and the like. The use of air is preferred.

The solid resin may be treated with oxygen, among other ways, by (a) exposing the resin in the form of a thin sheet or film, such as a film deposited upon a suitable metallic drum or other surface, or (b) by exposing the resin in finely divided or powdered form, to the action of oxygen, such as by permitting the powdered resin to fall through a vertical tower or vessel, or by agitating the finely divided powder, in the presence of oxygen or air. Such treatment preferably is carried out at elevated temperatures, such as temperatures in the range of 35 to 150° C., or even higher.

Another method of contacting the resin with oxygen comprises melting the resin and passing air or oxygen through the molten resin. A variation of this method comprises the addition of an organic and/or inorganic peroxide to the molten resin.

A preferred method of contacting the resin and oxygen comprises dissolving the resin in a suitable solvent, preferably substantially inert to the resin, such as a hydrocarbon solvent, for example an aromatic hydrocarbon solvent having no unsaturation other than in benzene rings, preferably boiling below 200° C., such as, xylene, and passing air or oxygen through the resin solution, preferably at elevated temperatures. A variation of this method comprises the addition of an oxygen yielding agent, such as an organic and/or an inorganic peroxide, to the resin solution.

Finally, the monomeric unsaturated high-boiling aromatic material from which the resin is derived may be treated prior to, or, during polymerization with oxygen, such as by passing a stream of air or oxygen through the material. If desired, this may be carried out at elevated temperatures, in which case a combination of inhibitor removal and polymerization is achieved. A variation of this method involves the addition of an oxygen yielding material, such as an organic and/or inorganic peroxide, to the monomeric material prior to, or during, polymerization.

Another method comprises contacting the polymerized high-boiling aromatic material with oxygen and/or an oxygen yielding substance prior to the removal of the unpolymerized material.

Any of the foregoing treating processes may be carried out at any desired temperature, although I generally prefer to employ temperatures in the range of 30 to 200° C. and more particularly 50 to 150° C., for this purpose.

When solvents are employed, they are preferably stable in character. I prefer to employ hydrocarbon, and more particularly aromatic hydrocarbon, solvents.

Catalysts also may be employed to assist in the oxidation process. I have found that metallic oxides and compounds, particularly manganese compounds such as potassium permanganate, are effective catalysts for this purpose.

I have found further that metallic compounds and particularly manganese compounds such as metallic permanganates, for example, potassium permanganate, are particularly effective catalysts when used in conjunction with ketones such as acetone.

The process may be illustrated by means of the following examples.

*Example 6*

A resin of the type prepared in Example 1 is melted, after which a stream of air is passed through the molten resin for a period of two hours with agitation. A resin possessing excellent drying properties is obtained.

*Example 7*

A sample of the resin prepared as in Example 1 is dissolved in xylene, after which a stream of air is passed through the solution for a period of two hours at a temperature of 100° C. Upon removing the solvent, a resin having excellent drying properties is obtained.

*Example 8*

This is a repetition of Example 7, with the exception that the resin solution obtained in Example 1 is used prior to the removal of unpolymerized material. After oxidation and removal of the unpolymerized material, a resin possessing good drying properties is obtained.

*Example 9*

A sample of the monomeric unsaturated high boiling aromatic material described herein is treated with a stream of air for a period of one hour at 50° C. The treated material is polymerized according to the method described in Example 1, whereupon a resin possessing excellent drying properties is obtained.

Coating compositions of the type described herein usually are prepared by incorporating the treated resin in a drying oil or bodied drying oil, followed by thinning the resulting mixture by the addition of a suitable solvent, such as a hydrocarbon solvent. Driers may be added to the mixture, as well as pigments, coloring agents, plasticizing agents, antiskinning agents, fillers, and/or other additives.

Examples of drying oils which may be employed in preparing my new coating compositions are tung oil, oiticica oil, perilla oil, dehydrated castor oil, fish oil, sardine oil, menhaden oil, linseed oil, soya bean oil, synthetic and/or modified drying oils, and the like.

Examples of thinners are hydrocarbon solvents derived from petroleum oils or cracked products, such as mineral spirits, V. M. and P. naphtha, and the like, hydrogenated and/or modified hydrocarbon solvents, coal tar solvents, such as toluol, xylol, and solvent naphtha, and similar materials.

Driers which may be used include the lead, manganese, and/or cobalt salts of high molecular weight organic acids, such as metallic resinates, naphthenates, oleates, and the like.

Pigments which may be incorporated in coating compositions of the type described include white lead, lead chromate, titanium oxide, red lead, zinc oxide, lithophone, chrome yellow, iron oxide, ochre, ultramarine blue, Prussian blue, lampblack, carbon black, and the like.

A preferred method of incorporating the treated resin in the drying oil comprises heating a mixture of the drying oil and treated resin to a suitable temperature for a period of time sufficient to insure the desired body. The mixture then is reduced to the desired viscosity by the addition of a suitable solvent, such as mineral spirits.

An alternative method comprises heating the drying oil, or a mixture of the drying oil and a portion of the treated resin, to the desired bodying temperature, and adding the treated resin, or the remainder of the treated resin at some stage of the bodying process. After the desired body had been attained, the mixture may be reduced by the addition of a suitable solvent.

The treated resin, or any portion of it, also may be used to check the bodying of the drying oil at any desired stage.

In addition, the treated resin may be incorporated in a previously bodied or partially bodied oil at a temperature substantially under the bodying temperature of the oil, if desired.

With respect to the oil length of the resulting coating composition, I have discovered that optimum results are secured when oil lengths under 25 gallons, and particularly under 20 gallons, are employed. Excellent results are secured in practically all cases when coating compositions having oil lengths of 15 gallons, or less, are employed.

Thus, for example, coating compositions possessing unusually desirable properties are obtained from linseed oil and a treated resin of the type described herein when such compositions have an oil length of from 6 to 10 gallons.

In a similar manner, excellent results are obtained with both perilla oil and fish oils when the resulting coating compositions have an oil length of 15 gallons, or less.

At higher oil lengths, the coating compositions may be slightly unstable. This is usually manifested by the precipitation of a portion of the resin from the coating composition during storage.

The foregoing preferred oil lengths pertain particularly to coating compositions in which petroleum hydrocarbon fractions such as mineral spirits or V. M. and P. naphtha, have been employed as solvents. In case a coal tar solvent, or mixture of coal tar solvent and petroleum hydrocarbon fraction, is used as the solvent, the indicated oil lengths can be increased substantially without seriously impairing the properties of the resulting coating compositions.

The oil lengths discussed in the foregoing paragraphs refer to the number of gallons of drying oil employed for each hundred pounds of treated resin.

The incorporation of a treated resin of the type described herein in a typical 15 gallon varnish is illustrated by the following example.

Example 10

A mixture of the treated resin and linseed oil is heated to a temperature of 580° F., after which it is held at this temperature for a period of one hour. The varnish then is reduced to 50% solids by the addition of mineral spirits.

A quantity of cobalt and lead naphthenates equivalent to 0.6% lead and 0.2% cobalt, expressed in terms of the respective metals as a percentage of the drying oil present, is added to the varnish when it reaches room temperature. A varnish having excellent drying properties is obtained.

Coating compositions of this type may be used as such for application to a wide variety of surfaces, or they may be modified by the addition of other ingredients before application.

Thus, for example, pigments may be incorporated in the varnish obtained in Example 10 by blending or mixing in a suitable mill or other device, such as a ball mill or a roller mill. The incorporation of pigments in such coating compositions is greatly facilitated by the exceptional wetting and dispersing properties of the treated resins of the type described herein, resulting in a marked decrease in the time required to produce a given enamel.

Lesser quantities of other resins may be incorporated in the coating compositions of the type described, if desired. In general, however, I prefer to employ treated resins of the type described herein as the sole resinous ingredient of the coating composition.

The excellent durability of coating compositions prepared from treated resins of the type described herein is illustrated by the following examples:

Example 11

A 15 gallon perilla oil varnish prepared from the resin obtained in Example 1 had a drying time of 20 hours. A similar varnish prepared from the treated resin obtained as in Example 6 had a drying time of only 7–8 hours.

To summarize, the hydrocarbon polymers or resins treated in accordance with this invention may be characterized as follows:

(1) The polymers or resins are comprised of carbon and hydrogen in chemical combination to at least 98% and more particularly, to at least 99%, other elements such as oxygen, nitrogen and/or sulfur derived from the oil pyrolyzed, if present, being restricted to less than 2%, and more particularly to less than 1%.

(2) The polymers or resins are substantially completely soluble in an excess of benzene, the proportion of insoluble material being less than 1%, and more particularly, less than 0.1% of the polymer or resin.

(3) The polymers or resins have an ash content determined by burning of less than 1%, and more particularly, of less than 0.1%.

(4) Upon subjecting the polymers or resins to destructive distillation under vacuum to effect depolymerization, that portion of the oily material recovered as overhead which boils above 200° C. has a refractivity intercept of at least 1.08 and particularly of at least 1.09 and still more particularly, of at least 1.10.

(5) Polymers or resins hardened by distilling to an overhead temperature between approximately 190 to 200° C. at 20 mm. Hg absolute pressure in accordance with the procedure of Example I have the following characteristics;

(a) They have A. S. T. M. ball and ring softening points of at least 40° C. and more particularly of at least 80° C. For example, typical polymers or resins polymerized by surface active agents such as clay, as catalysts, have A. S. T. M. ball and ring softening points of at least 40° C., such as between 60° C. and 80° C. or above, and typical polymers or resins polymerized by heat, or with acid or acid-acting catalysts, have A. S. T. M. ball and ring softening points of at least 80° C., such as between 90° and 110° C. and higher, such as up to 120° C. or above.

(b) They have densities of at least 1.10 and up to 1.20 and higher, such as between 1.13 and 1.18, as determined by the water displacement method.

(c) They have molecular weight between 300 and 1000 as determined by the freezing point depression method employing benzene as the solvent.

(d) They have a solubility in an equal quantity by weight of toluene at a temperature of 20° C. of at least 30 grams, and preferably of at least 50 grams, in 100 grams of toluene.

(e) One part of the polymers or resins when dissolved in three parts by weight of benzene having a density ($d_{20}^{4}$) of 0.8790 and a refractivity intercept of 1.0623, makes four parts of a solution having a density greater than 0.925 and a refractivity intercept greater than 1.069. Neglecting any possible change that may occur in the solid when it is dissolved, calculated values for the polymers or resins themselves, that is, apart from the solvent, (densities and refractivity intercepts being additive on a volume basis) become for densities at least 1.10, and for refractivity intercepts at least 1.08, and particularly, at least 1.09, and still more particularly, at least 1.10.

(6) The oils from which the polymers or resins are polymerized have mixed aniline points below 15° C., and more particularly, below 10° C., for example, between 10 and 4° C. and lower. A mixed aniline point of a given oil is defined as the critical solution temperature of a mixture of 10 cc. of anhydrous aniline, 5 cc. of the oil being tested and 5 cc. of a petroleum naphtha having an aniline point of 60° C. as determined by A. S. T. M. tentative standard D611-41T.

(7) The oils from which the polymers or resins are polymerized usually having refractivity intercepts of not less than 1.08, for example, between 1.09 and 1.11, and higher, such as, up to 1.125 or 1.135.

(8) The oils from which the polymers or resins are polymerized contain at least 90%, such as not less than 95%, and more particularly not less than 97% of aromatic hydrocarbons.

(9) The oils from which the polymers or resins are polymerized have densities of not less than 0.95, and, more particularly, of not less than 0.98, for example, between 0.99 and 1.02, and higher, such as up to 1.11 or 1.12.

(10) Liquid material extracted from the polymers or resins using a large excess of pentane has refractivity intercepts of at least 1.08 and more particularly, of at least 1.09, and still more particularly, of at least 1.10.

(11) The oil separated from the polymers or resins after polymerization usually has a density of not less than 0.95 and, more particularly, of not less than 0.98, for example, between 0.99 and 1.02 and higher, such as up to 1.11 or 1.12. Such oils separated from the polymers or resins after polymerization also usually have refractivity intercepts of not less than 1.08, for example, between 1.09 and 1.11, and higher, such as up to 1.125 or 1.135, and contain at least 90%, such as at least 95%, and more particularly, at least 97% aromatic hydrocarbons.

(12) Rerfractivity intercept when referred to herein is determined by the method described in the Science of Petroleum (1938), vol. 2, beginning on page 1175, and publications referred to therein.

In the specification and in the claims the term "treated resin" is intended to mean a resin of the type described herein, the said resin and/or the monomeric material from which it is prepared having been treated with oxygen and/or an oxygen-containing and/or oxygen-yielding material.

While various procedures and formulas have been particularly described these are of course subject to considerable variation. Therefore, it will be understood that the foregoing specific examples are given by way of illustration, and that changes, omissions, additions, substitutions and/or modifications might be made within the scope of the claims without departing from the spirit of the invention, which is intended to be limited only as required by the prior art.

I claim:

1. A coating composition comprising a drying oil and a hydrocarbon resin polymer selected from the group consisting of heat resin polymer and catalytic resin polymer of polymerizable hydrocarbons contained in a hydrocarbon oil which has been physically separated from tar produced in the vapor phase pyrolysis of petroleum oil and which is free from and of greater volatility than the pitch of said tar, said hydrocarbon oil when separated and when subjected to polymerization containing in addition to hydrocarbons boiling between 210° C. and 350° C. which are not polymerizable by the application to said oil of heat alone but which are polymerizable to catalytic resin polymer by treating said oil with a resin-producing catalyst, other hydrocarbons boiling between 210° C. and 350° C. which are polymerizable to catalytic resin polymer by treating said oil with a resin-producing catalyst but which last-mentioned hydrocarbons are also polymerizable to heat resin polymer by the application to said oil of heat alone, said last-mentioned hydrocarbons being present in said hydrocarbon oil in amount greater than approximately 5% of the total hydrocarbon oil boiling between 210° C. and 350° C., the proportion of drying oil to resin polymer being such as to produce a coating composition having an oil length of less than 25 gallons, in the said resin the drying inhibitors naturally present in the resin as produced having been removed by reaction with oxygen at a temperature within the range of 30° C. to 200° C. in a solution of the said resin to improve the properties of the resin for inclusion in coating compositions.

2. As a new composition of matter, a hydrocarbon resin polymer selected from the group consisting of heat resin polymer and catalytic resin polymer of polymerizable hydrocarbons contained in a hydrocarbon oil which has been physically separated from tar produced in the vapor phase pyrolysis of petroleum oil and which is free from and of greater volatility than the pitch of said tar, said hydrocarbon oil when separated and when subjected to polymerization containing in addition to hydrocarbons boiling between 210° C. and 350° C. which are not polymerizable by the application to said oil of heat alone but which are polymerizable to catalytic resin polymer by treating said oil with a resin-producing catalyst, other hydrocarbons boiling between 210° C. and 350° C. which are polymerizable to catalytic resin polymer by treating said oil with a resin-producing catalyst but which last-mentioned hydrocarbons are also polymerizable to heat resin polymer by the application to said oil of heat alone, said last-mentioned hydrocarbons being present in said hydrocarbon oil in amount greater than approximately 5% of the total hydrocarbon oil boiling between 210° C. and 350° C., in the said resin the drying inhibitors naturally present in the resin as produced having been removed by reaction with oxygen at a temperature within the range of 30° C. to 200° C. in a solution of the said resin to improve the properties of the resin for inclusion in coating compositions.

3. A process for improving the properties for inclusion in coating compositions of a hydrocarbon resin polymer selected from the group consisting of heat resin polymer and catalytic resin polymer of polymerizable hydrocarbons contained in a hydrocarbon oil which has been physically separated from tar produced in the vapor phase pyrolysis of petroleum oil and which is free from and of greater volatility than the pitch of said tar, said hydrocarbon oil when separated and when subjected to polymerization containing in addition to hydrocarbons boiling between 210° C. and 350° C. which are not polymerizable by the application to said oil of heat alone but which are polymerizable to catalytic resin polymer by treating said oil with a resin-producing catalyst, other hydrocarbons boiling between 210° C. and 350° C. which are polymerizable to catalytic resin polymer by treating said oil with a resin-producing catalyst but which last-mentioned hydrocarbons are also polymerizable to heat resin polymer by the application to said oil of heat alone, said last-mentioned hydrocarbons being present in said hydrocarbon oil in amount greater than approximately 5% of the total hydrocarbon oil boiling between 210° C. and 350° C., which comprises forming a solution of the said resin in a solvent therefor, and removing from the resin drying inhibitors naturally present therein as the said resin is produced by reacting the resin in solution with oxygen at a temperature within the range of 30° C. to 200° C.

4. A coating composition comprising a drying oil and a hydrocarbon resin polymer selected from the group consisting of heat resin polymer and catalytic resin polymer of polymerizable hydrocarbons contained in a hydrocarbon oil which has been physically separated from tar produced in the vapor phase pyrolysis of petroleum oil and which is free from and of greater volatility than the pitch of said tar, said hydrocarbon oil when separated and when subjected to polymerization containing in addition to hydrocarbons boiling between 210° C. and 350° C. which are not polymerizable to catalytic resin polymer by treating said oil with a resin-producing catalyst, other hydrocarbons boiling between 210° C. and 350° C. which are polymerizable to catalytic resin polymer by treating said oil with a resin-producing catalyst but which last-mentioned hydrocarbons are also polymerizable to heat resin polymer by the application to said oil of heat alone, said last-mentioned hydrocarbons being present in said hydrocarbon oil in amount greater than approximately 5% of the total hydrocarbon oil boiling between 210° C. and 350° C., the proportion of drying oil to resin polymer being such as to produce a coating composition having an oil length of less than 25 gallons, in the said resin the drying inhibitors naturally present as the resin is produced having been removed by reaction with oxygen at a temperature within the range of 30° C. to 200° C. in a solution of the said resin and in the presence of a metallic oxide oxidation catalyst to improve the properties of the resin for inclusion in coating compositions.

5. As a new composition of matter, a hydrocarbon resin polymer selected from the group consisting of heat resin polymer and catalytic resin polymer of polymerizable hydrocarbons contained in a hydrocarbon oil which has been physically separated from tar produced in the vapor phase pyrolysis of petroleum oil and which is free from and of greater volatility than the pitch of said tar, said hydrocarbon oil when separated and when subjected to polymerization containing in addition to hydrocarbons boiling between 210° C. and 350° C. which are not polymerizable by the application to said oil of heat alone but which are polymerizable to catalytic resin polymer by treating said oil with a resin-producing catalyst, other hydrocarbons boiling between 210° C. and 350° C. which are polymerizable to catalytic resin polymer by treating said oil with a resin-producing catalyst but which last-mentioned hydrocarbons are also polymerizable to heat resin polymer by the application to said oil of heat alone, said last-mentioned hydrocarbons being present in said hydrocarbon oil in amount greater than approximately 5% of the total hydrocarbon oil boiling between 210° C. and 350° C., in the said resin the drying inhibitors naturally present in the resin as produced having been removed by reaction with oxygen at a temperature within the range of 30° C. to 200° C. and in the presence of a metallic oxide oxidation catalyst in a solution of the said resin to improve the properties of the resin for inclusion in coating compositions.

6. A process for improving the properties for inclusion in coating compositions of a hydrocarbon resin polymer selected from the group consisting of heat resin polymer and catalytic resin polymer of polymerizable hydrocarbons contained in a hydrocarbon oil which has been physically separated from tar produced in the vapor phase pyrolysis of petroleum oil and which is free from and of greater volatility than the pitch of said tar, said hydrocarbon oil when separated and when subjected to polymerization containing in addition to hydrocarbons boiling between 210° C. and 350° C. which are not polymerizable by the application to said oil of heat alone but which are polymerizable to catalytic resin polymer by treating said oil with a resin-producing catalyst, other hydrocarbons boiling between 210° C. and 350° C. which are polymerizable to catalytic resin polymer by treating said oil with a resin-producing catalyst but which last-mentioned hydrocarbons are also polymerizable to heat resin polymer by the application to said oil of heat alone, said last-mentioned hydrocarbons being present in said hydrocarbon oil in amount greater than approximately 5% of the total hydrocarbon oil boiling between 210° C. and 350° C., which comprises forming a solution of the said resin, and removing from the resin drying inhibitors naturally present therein as the said resin is produced by reacting the resin in solution with oxygen at a temperature within the range of 30° C. to 200° C. and in the presence of a metallic oxide oxidation catalyst.

FRANK J. SODAY.

REFERENCES CITED

The following references are of record in the file of this patent:

UNITED STATES PATENTS

| Number | Name | Date |
|---|---|---|
| 2,052,173 | Frolich et al. | Aug. 25, 1936 |
| 2,150,641 | Thomas et al. | Mar. 14, 1939 |
| 2,387,259 | Hall et al. | Oct. 23, 1945 |
| 2,395,076 | Soday | Feb. 19, 1946 |